(12) United States Patent
Williams et al.

(10) Patent No.: US 10,144,332 B2
(45) Date of Patent: Dec. 4, 2018

(54) CHILD SEAT HAVING AN OBJECT HOLDER

(71) Applicant: Wonderland Nurserygoods Company Limited, Kwai Chung (HK)

(72) Inventors: Bruce L. Williams, Narvon, PA (US); Gregory S. Sellers, Christiana, PA (US)

(73) Assignee: Wonderland Switzerland AG, Steinhausen (CH)

( * ) Notice: Subject to any disclaimer, the term of this patent is extended or adjusted under 35 U.S.C. 154(b) by 101 days.

(21) Appl. No.: 14/990,021

(22) Filed: Jan. 7, 2016

(65) Prior Publication Data

US 2016/0200234 A1    Jul. 14, 2016

Related U.S. Application Data

(60) Provisional application No. 62/101,563, filed on Jan. 9, 2015, provisional application No. 62/243,922, filed on Oct. 20, 2015.

(51) Int. Cl.
| | |
|---|---|
| *B60N 3/10* | (2006.01) |
| *B60N 2/26* | (2006.01) |
| *B60N 2/28* | (2006.01) |

(52) U.S. Cl.
CPC .......... *B60N 3/102* (2013.01); *B60N 2/2806* (2013.01); *B60N 2/2821* (2013.01); *B60N 2/2851* (2013.01); *B60N 2/2863* (2013.01); *B60N 2/2872* (2013.01); *B60N 2/2875* (2013.01)

(58) Field of Classification Search
None
See application file for complete search history.

(56) References Cited

U.S. PATENT DOCUMENTS

| | | | | |
|---|---|---|---|---|
| 5,494,249 A | * | 2/1996 | Ozark | B60N 3/102 224/926 |
| 6,478,372 B1 | * | 11/2002 | Lemmeyer | B60N 2/2821 297/188.18 |
| 2002/0190547 A1 | * | 12/2002 | Kain | B60N 2/2812 297/188.21 |
| 2003/0075957 A1 | * | 4/2003 | Kain | B60N 2/2866 297/188.01 |
| 2006/0113826 A1 | * | 6/2006 | Balensiefer | B60N 2/2866 297/188.01 |
| 2006/0261651 A1 | * | 11/2006 | Nolan | B60N 2/2806 297/250.1 |
| 2006/0266748 A1 | * | 11/2006 | Crawford | A47G 19/065 220/23.8 |

(Continued)

Primary Examiner — Joshua J Michener
Assistant Examiner — Kyle J. Walraed-Sullivan
(74) Attorney, Agent, or Firm — Daniel A. Tallitsch; Baker McKenzie LLP

(57) ABSTRACT

A child seat includes a shell body, and an object holder including a bracket, a support base, and a flexible linking member having a first and a second end respectively attached to the bracket and the support base. The bracket is movably assembled with the shell body so that the object holder is movable between a storage state and a deployed state, and the support base is movable relative to the bracket between a collapse position where the support base is received within an opening defined through the bracket, and an expanding position where the support base is hung below the bracket.

16 Claims, 21 Drawing Sheets

(56) References Cited

U.S. PATENT DOCUMENTS

| | | | |
|---|---|---|---|
| 2006/0273637 A1* | 12/2006 | Yumoto | B60N 2/2806 297/250.1 |
| 2007/0057547 A1* | 3/2007 | Hartenstine | B60N 2/2806 297/256.13 |
| 2007/0170759 A1* | 7/2007 | Nolan | B60N 2/2851 297/250.1 |
| 2007/0228788 A1* | 10/2007 | Meeker | B60N 2/2806 297/250.1 |
| 2008/0099476 A1* | 5/2008 | Fung | A47J 36/02 220/6 |
| 2008/0197679 A1* | 8/2008 | Cymbalski | B60N 2/28 297/188.14 |
| 2009/0114657 A1* | 5/2009 | Hsu | A47G 19/02 220/574 |
| 2009/0115230 A1* | 5/2009 | Haut | B60N 2/2866 297/188.16 |
| 2009/0236881 A1* | 9/2009 | Freeman | B60N 2/28 297/188.21 |
| 2010/0308042 A1* | 12/2010 | Faris | B65D 11/02 220/8 |
| 2011/0148160 A1* | 6/2011 | Meeker | B60N 2/2806 297/250.1 |
| 2011/0248037 A1* | 10/2011 | Fung | B65D 21/0219 220/592.2 |
| 2011/0248040 A1* | 10/2011 | McGregor | A45C 7/0036 220/666 |
| 2011/0303659 A1* | 12/2011 | Perlman | A45F 3/20 220/8 |
| 2012/0292956 A1* | 11/2012 | Gaudreau, Jr. | B60N 3/103 297/188.04 |
| 2013/0075562 A1* | 3/2013 | Miklas | B60N 3/102 248/286.1 |
| 2013/0126691 A1* | 5/2013 | Miklas | B60N 3/102 248/311.2 |
| 2013/0277364 A1* | 10/2013 | Kusuma | A45F 3/20 220/8 |
| 2014/0062152 A1* | 3/2014 | Doolan | B60N 3/101 297/256.13 |
| 2014/0077544 A1* | 3/2014 | Gaudreau, Jr. | B60N 3/101 297/250.1 |
| 2014/0125099 A1* | 5/2014 | Williams | B60N 2/2821 297/250.1 |
| 2014/0339861 A1* | 11/2014 | Chen | A47D 1/008 297/173 |
| 2015/0201779 A1* | 7/2015 | Tittel | A45F 3/20 220/731 |

\* cited by examiner

CHILD SEAT HAVING AN OBJECT HOLDER

CROSS-REFERENCE TO RELATED APPLICATION(S)

This patent application claims priority to U.S. Provisional Pat. Application No. 62/101,563 filed on Jan. 9, 2015, and to U.S. Provisional Pat. Application No. 62/243,922 filed on Oct. 20, 2015, respectively, the disclosures of which are incorporated herein by reference.

BACKGROUND

1. Field of the Invention

The present invention relates to child seats having object holders.

2. Description of the Related Art

Certain child safety seats available on the market can be equipped with a cup holder used as a convenience feature for children. Cup holders are usually attached to the sides of the child safety seat. As a result, the addition of the cup holders increases the width of the child safety seat, which may diminish the usability of adjacent vehicle seating areas for passengers or other restraints on a vehicle seat.

Therefore, there is a need for a child seat having an object holder that can be conveniently stored and deployed for use, and can address at least the foregoing issues.

SUMMARY

The present application describes a child seat provided with an object holder. In one embodiment, the child seat includes a shell body, and an object holder including a bracket, a support base, and a flexible linking member having a first and a second end respectively attached to the bracket and the support base. The bracket is movably assembled with the shell body so that the object holder is movable between a storage state and a deployed state, and the support base is movable relative to the bracket between a collapse position where the support base is received within an opening defined through the bracket, and an expanding position where the support base is hung below the bracket.

In another embodiment, the child seat includes a shell body, and an object holder including a bracket, a support base, and a flexible linking member having a first and a second end respectively attached to the bracket and the support base. The bracket has an outer surface and an opening exposed on the outer surface, the bracket being movably assembled with the shell body so that the object holder is movable between a storage state and a deployed state, and the support base being movable through the opening between a collapse position and an expanding position, the support base in the collapse position being substantially flush with the outer surface of the bracket, and the support base in the expanding position being hung by the linking member below the bracket.

In yet another embodiment, the child seat includes a shell body having a sidewall provided with a hole, a restraint harness installable through the hole for attaching the child seat on a vehicle seat, and an object holder connected with the shell body, the object holder being movable between a storage state closing the hole and a deployed state opening the hole.

DETAILED DESCRIPTION OF THE EMBODIMENTS

Figure 1:
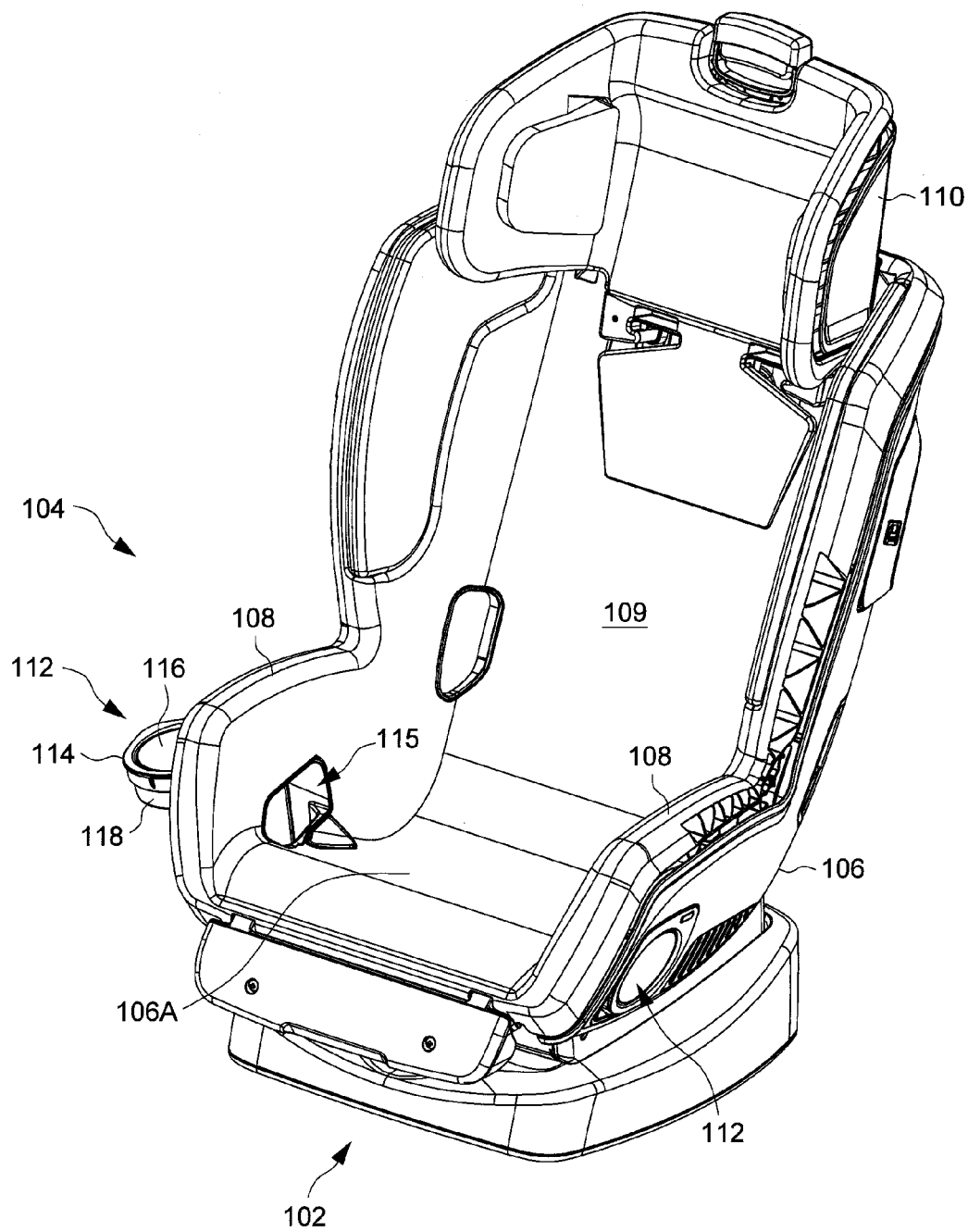
FIG. 1 is a schematic perspective view illustrating an embodiment of a child seat.
Figure 2:
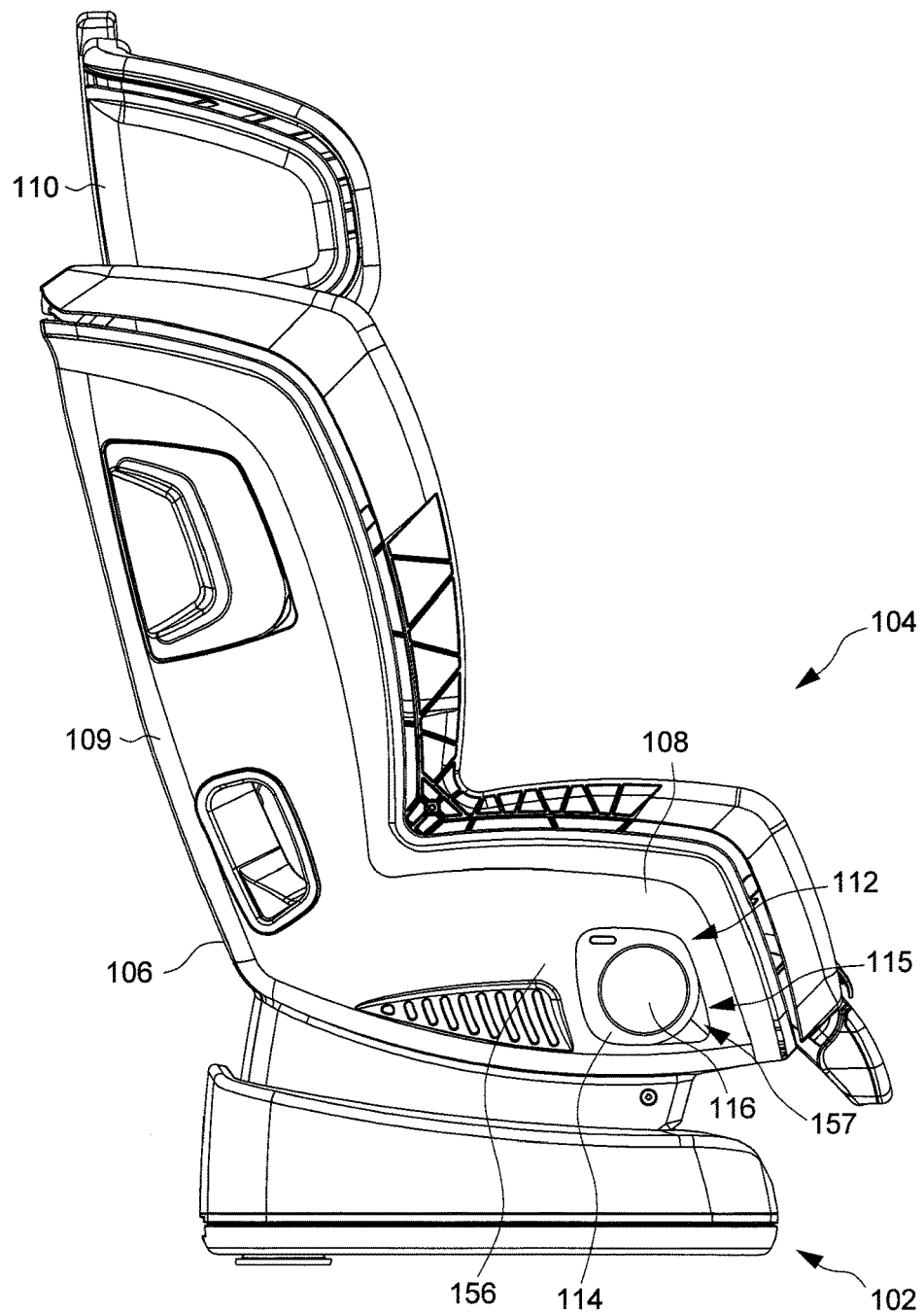
FIG. 2 is a side view of the child seat shown in FIG. 1 having an object holder in a storage state.

FIG. 1 is a perspective view illustrating an embodiment of a child seat 100, and FIG. 2 is a side view of the child seat 100. The child seat 100 can include a base 102, and a seat portion 104 connected with the base 102. The base 102 can be placed on a vehicle seat or other surface (not shown). The seat portion 104 can include a rigid shell body 106 for receiving a child. The shell body 106 can include two sidewalls 108 and a backrest portion 109 that delimit at least partially a sitting region of the shell body 106. The two sidewalls 108 respectively rise upward from a seat surface 106A at a left and a right side of the shell body 106. The backrest portion 109 can be assembled with a headrest 110, which can be vertically adjusted relative to the backrest portion 109 to adapt to a child size. In one embodiment, the shell body 106 may be movably assembled with the base 102 so as to allow recline adjustment of the shell body 106 relative to the base 102.

The child seat 100 can further include an object holder 112 assembled with the shell body 106 on one or both of the sidewalls 108. The object holder 112 can be disposed adjacent to a hole 115, which is formed through the sidewall 108 near a front of the shell body 106. The object holder 112 can be movable between a storage state (shown in FIG. 2) for facilitating its storage through the hole 115 of the sidewall 108, and a deployed state for use (better shown in FIGS. 3 and 4).

Figure 6:
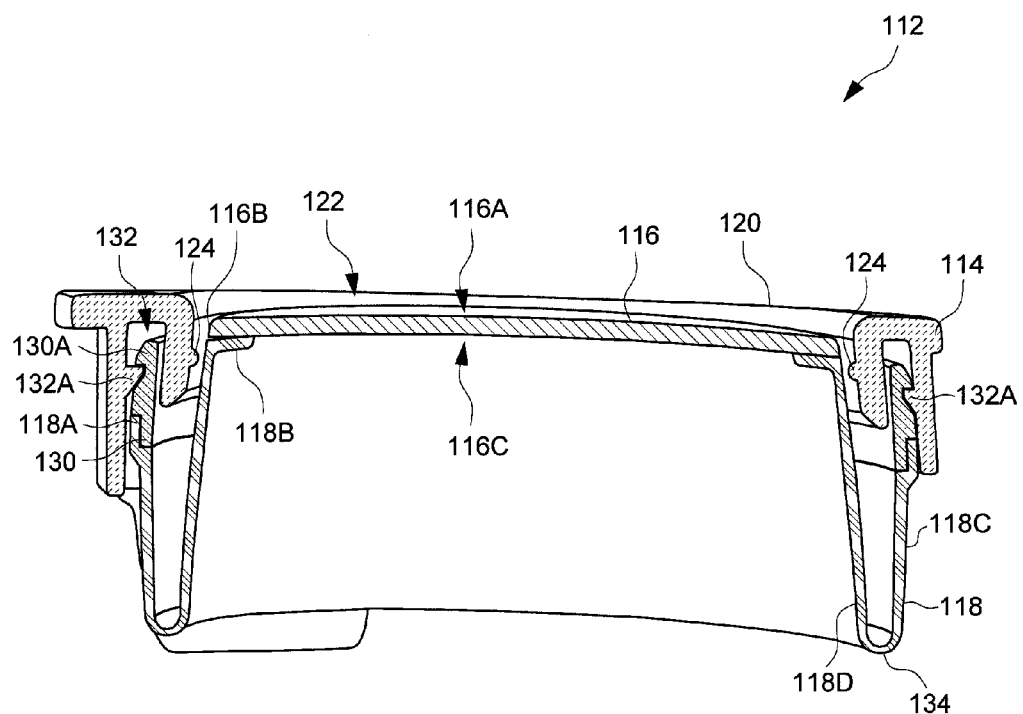
FIG. 6 is a schematic cross-sectional view of the object holder shown in FIG. 5 with the support base in the collapse position.
Figure 7:
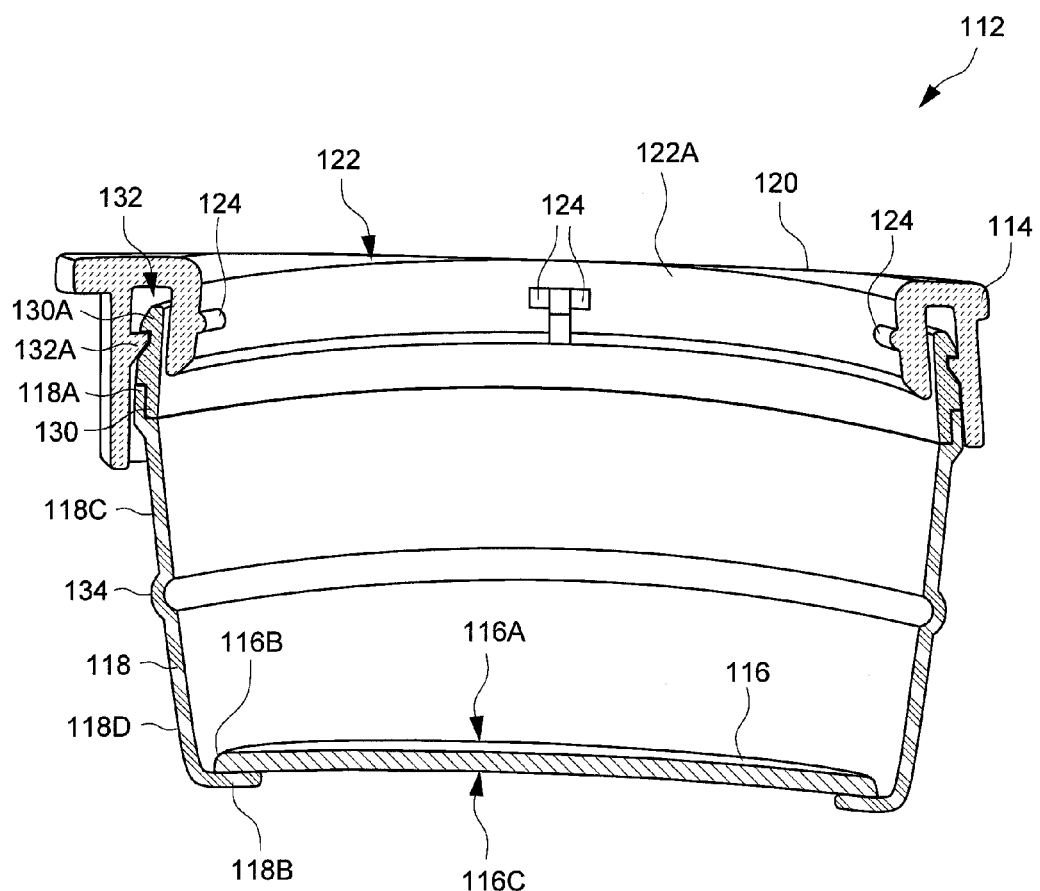
FIG. 7 is a schematic cross-sectional view of the object holder shown in FIG. 5 with the support base in the expanding position.
Figure 8:
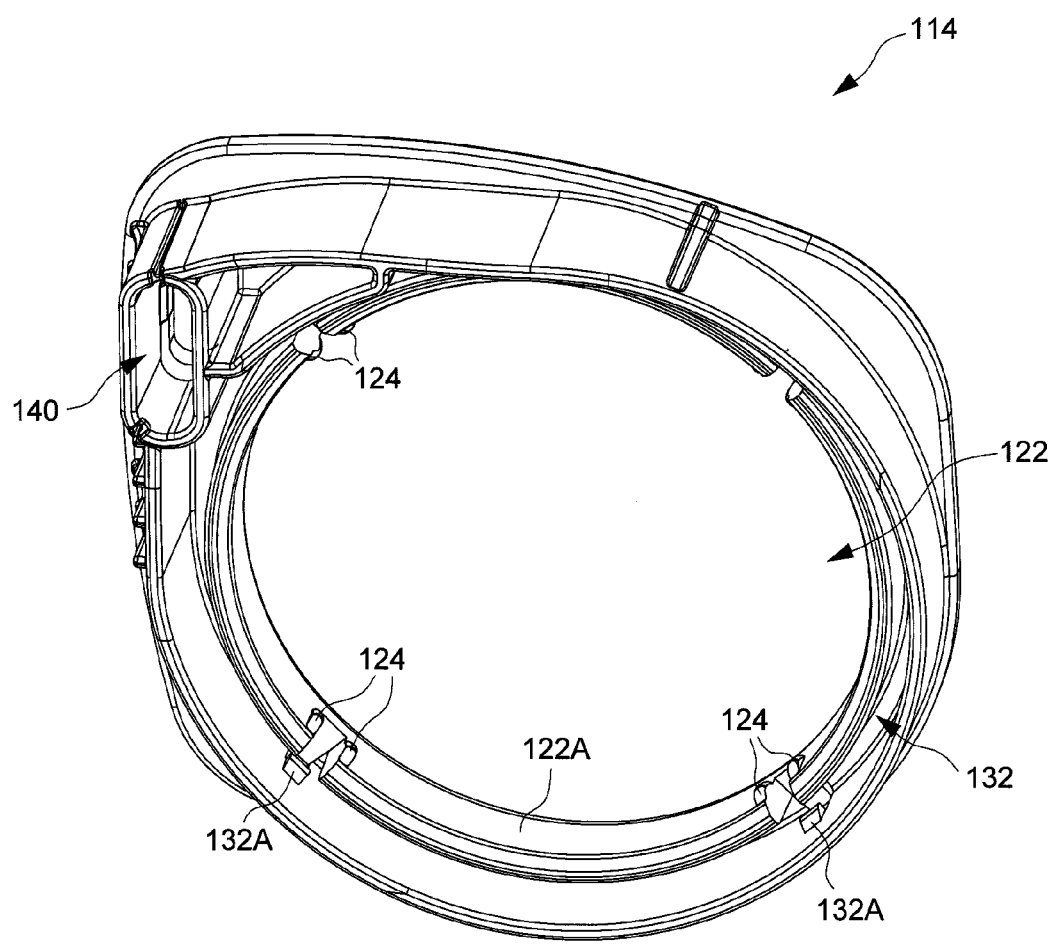
FIG. 8 is perspective view illustrating a bracket of the object holder.
Figure 9:
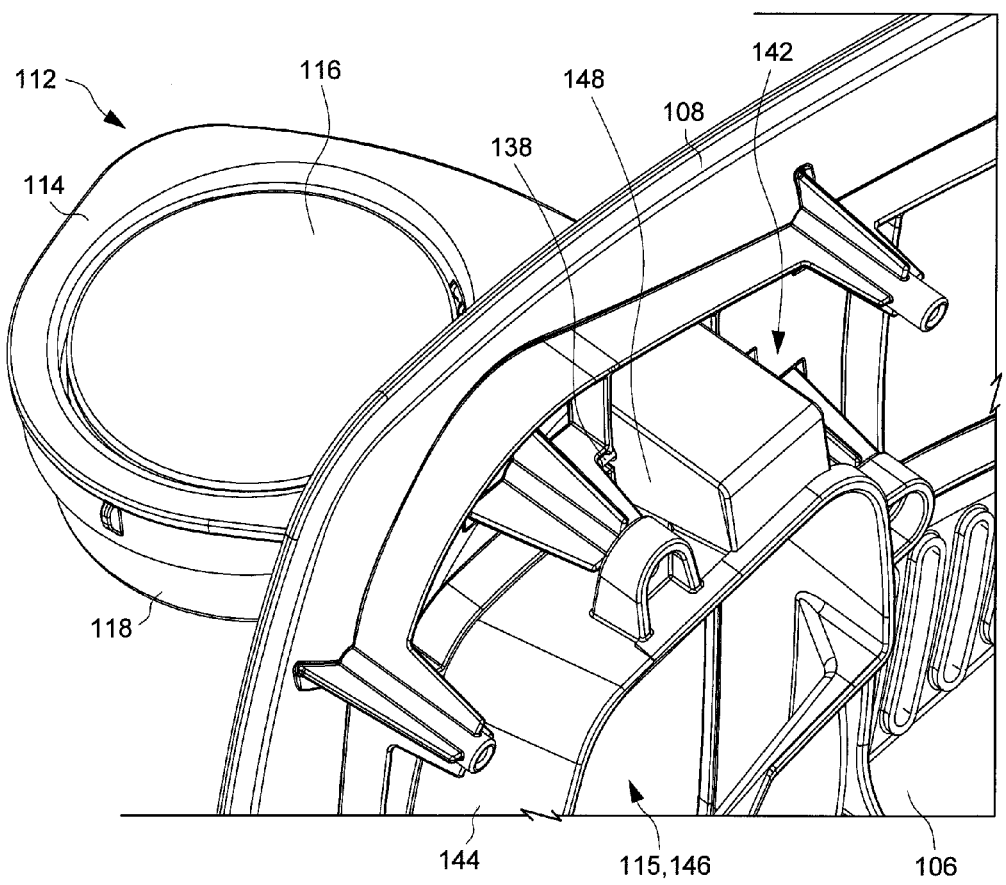
FIG. 9 is a schematic view illustrating the assembly of the object holder with a mount frame portion provided in the shell body of the child seat.
Figure 10:
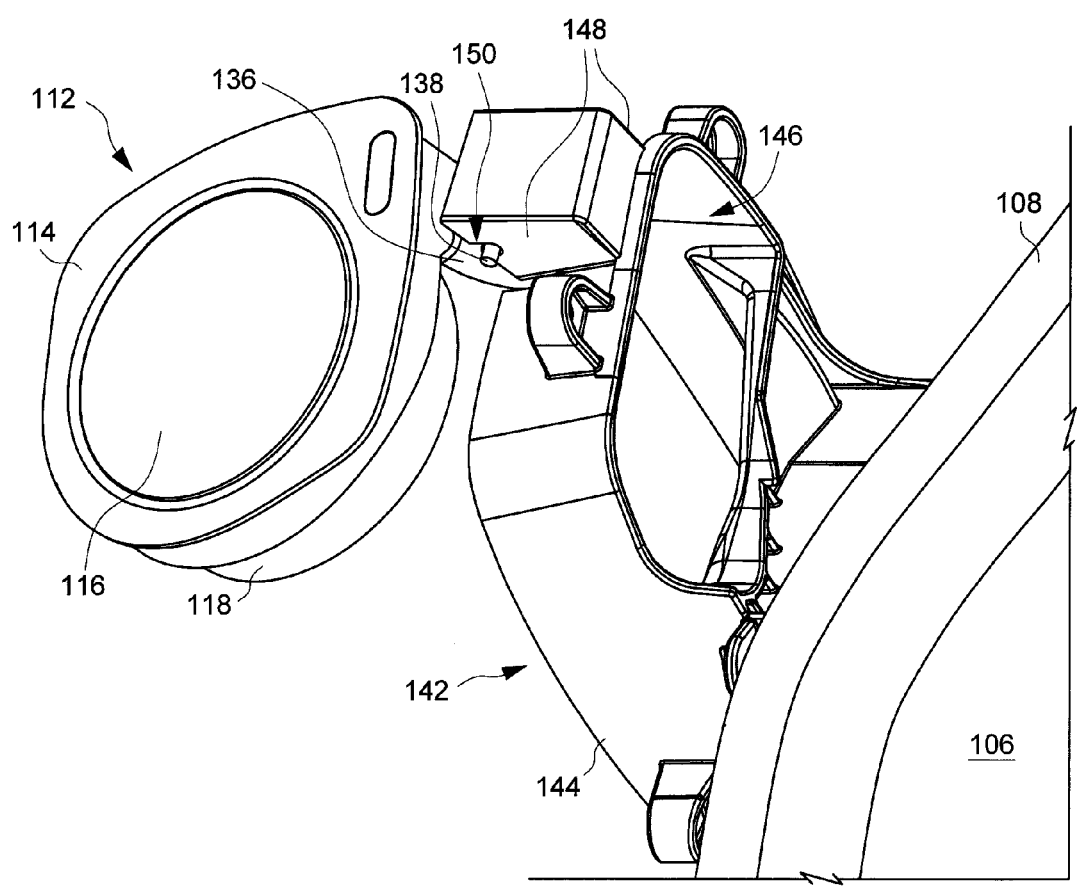
FIGS. 10 and 11 are schematic views illustrating the assembly of the object holder with the mount frame portion under different perspectives.
Figure 11:
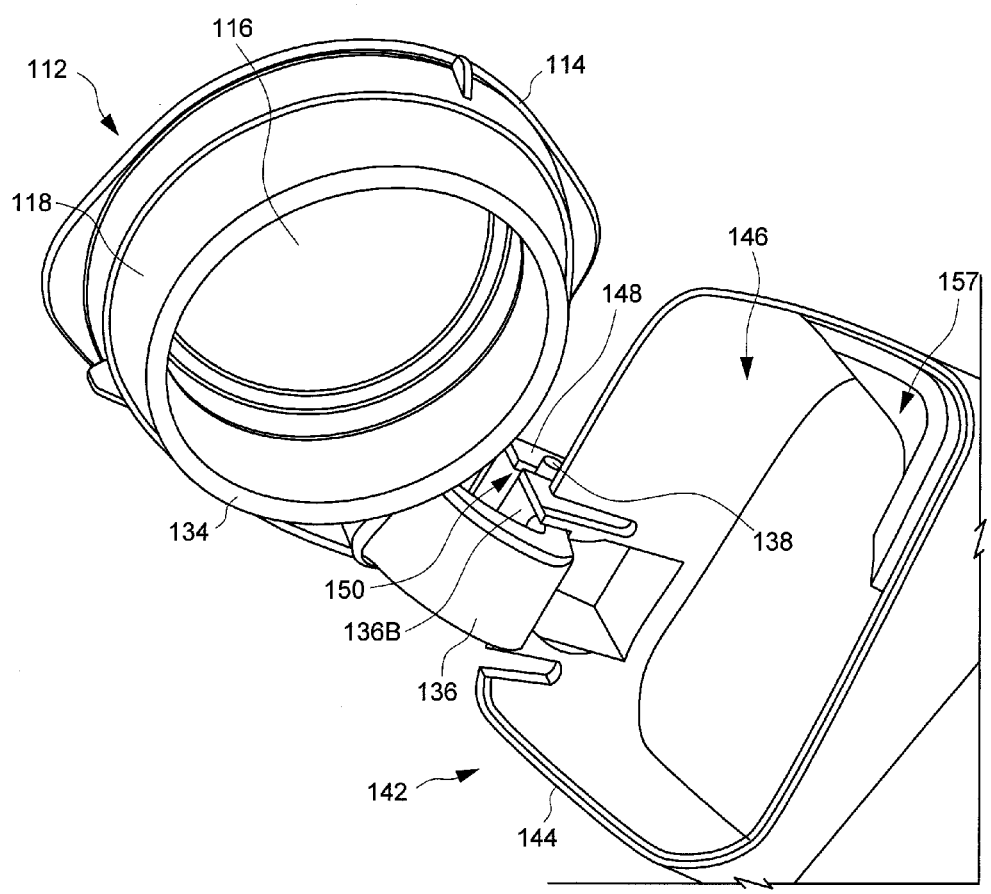

In conjunction with FIGS. 1-4, FIGS. 5-8 are various schematic views illustrating the construction of the object holder 112. The object holder 112 can include a bracket 114, a support base 116 and a flexible linking member 118. FIG. 8 is a schematic view illustrating the bracket 114 alone. Referring to FIGS. 5-8, the bracket 114 can have an outer surface 120, and an opening 122 that is formed through the bracket 114 and is exposed on the outer surface 120. The opening 122 can exemplary have a circular shape, and an inner sidewall 122A of the opening 122 can be formed with one or more inward protrusions 124.

Figure 5:
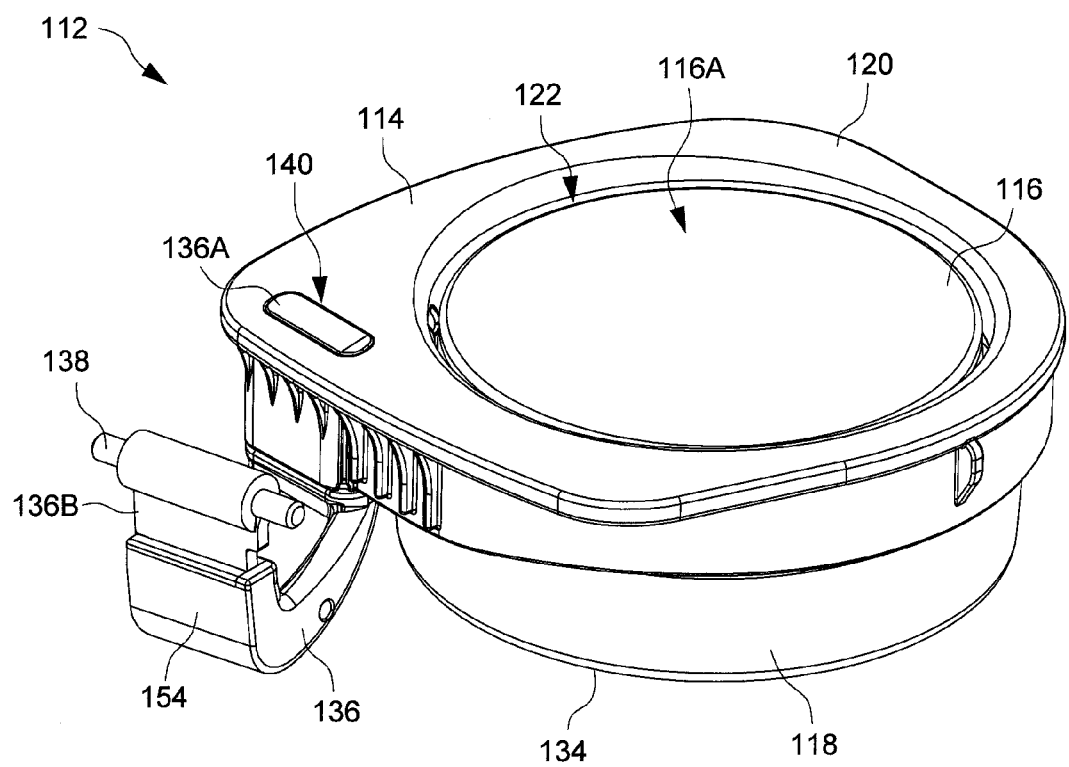
FIG. 5 is a perspective view illustrating the construction of the object holder and a rotary arm coupled therewith.

Referring to FIGS. 5-7, the support base 116 is made of a rigid material, and can provide support for various objects disposed in the object holder 112. The support base 116 can be generally flat, and can have a shape that is complementary to that of the opening 122 of the bracket 114. In one embodiment, the support base 116 can be provided as a single part, and can exemplary have a disk shape. It will be understood, however, that the support base 116 may have any suitable shapes. The support base 116 can have two outer major surfaces 116A and 116C opposite to each other.

The linking member 118 can be made of a flexible material, and can have a first and a second end 118A and 118B respectively attached to the bracket 114 and the support base 116. The coupling of the linking member 118 allows sliding movement of the support base 116 relative to the bracket 114 between a collapse position where the support base 116 is received within the opening 122 of the bracket 114 (better shown in FIGS. 3 and 6), and an expanding position where the support base 116 is hung by the linking member 118 away from the opening 122 of the bracket 114 (better shown in FIGS. 4 and 7). While the support base 116 is received in the opening 122 in the collapse position, the outer major surface 116A of the support base 116 can be substantially flush with the outer surface 120 of the bracket 114, and the linking member 118 is in a folded state and can extend at least partially outside the bracket 114. While it is in the expanding position, the support base 116 is hung below the outer surface 120 of the bracket 114 by the linking member 118 in a stretched state. The stretched linking member 118 and the support base 116 in the expanding position can delimit at least partially an inner space for placement of various items on the major surface 116A of the support base 116, e.g., a drinking bottle, a cup, a snack, etc.

In one embodiment, the linking member 118 can be an elastic member, e.g., made of thermoplastic elastomer (TPE) or other rubber-like material. For attaching the first end 118A of the linking member 118 to the bracket 114, a collar 130 having a catch 130A can be affixed to the first end 118A of the linking member 118, and the bracket 114 can have a slot 132 into which the collar 130 can be inserted, the catch 130A of the collar 130 engaging with one or more protruding rib 132A provided in the slot 132. The second end 118B of the linking member 118 can be affixed to the support base 116 along an outermost peripheral edge 116B thereof. In one embodiment, a co-injection process can be applied so that the linking member 118 can be formed as a part directly joined with the collar 130 and/or the support base 116.

Referring again to FIGS. 6 and 7, an intermediate region of the linking member 118 between the first and second ends 118A and 118B can have a crease 134, and two portions 118C and 118D joined with each other along the crease 134. The linking member 118 can be folded over along the crease 134 so that the two portions 118C and 118D substantially overlap each other when the support base 116 is in the collapse position. The linking member 118 can self-hold this folded state so as to assist in bearing the support base 116 in the collapse position, the two portions 118C and 118D folded over each other extending at least partially outside the bracket 114 while the support base 116 is in the collapse position. When the support base 116 is in the expanding state, the linking member 118 can be unfolded so that the two portions 118C and 118D are stretched for hanging the support base 116 below the bracket 114.

Referring again to FIG. 6, while the support base 116 is received in the opening 122 in the collapse state, the inward protrusions 124 form one or more abutments that can contact with the linking member 118 and/or the support base 116 at one or multiple circumferential locations for preventing sideways displacement of the support base 116 relative to the bracket 114.

In conjunction with FIGS. 5-8, FIGS. 9-12 are schematic views illustrating the assembly of the object holder 112 with the shell body 106. Referring to FIGS. 5 and 9-12, the object holder 112 can be pivotally connected with the shell body 106. In one embodiment, a rotary arm 136 can be provided to pivotally assemble the object holder 112 with the shell body 106. The rotary arm 136 can have a first end 136A affixed to the bracket 114, and a second end 136B affixed with a shaft 138. The first end 136A of the rotary arm 136 can be fixedly secured in a slot 140 formed through the bracket 114. In one embodiment, the rotary arm 136 can exemplary have a bent shape, and the shaft 138 can be offset from a side of the bracket 114.

Figure 12:
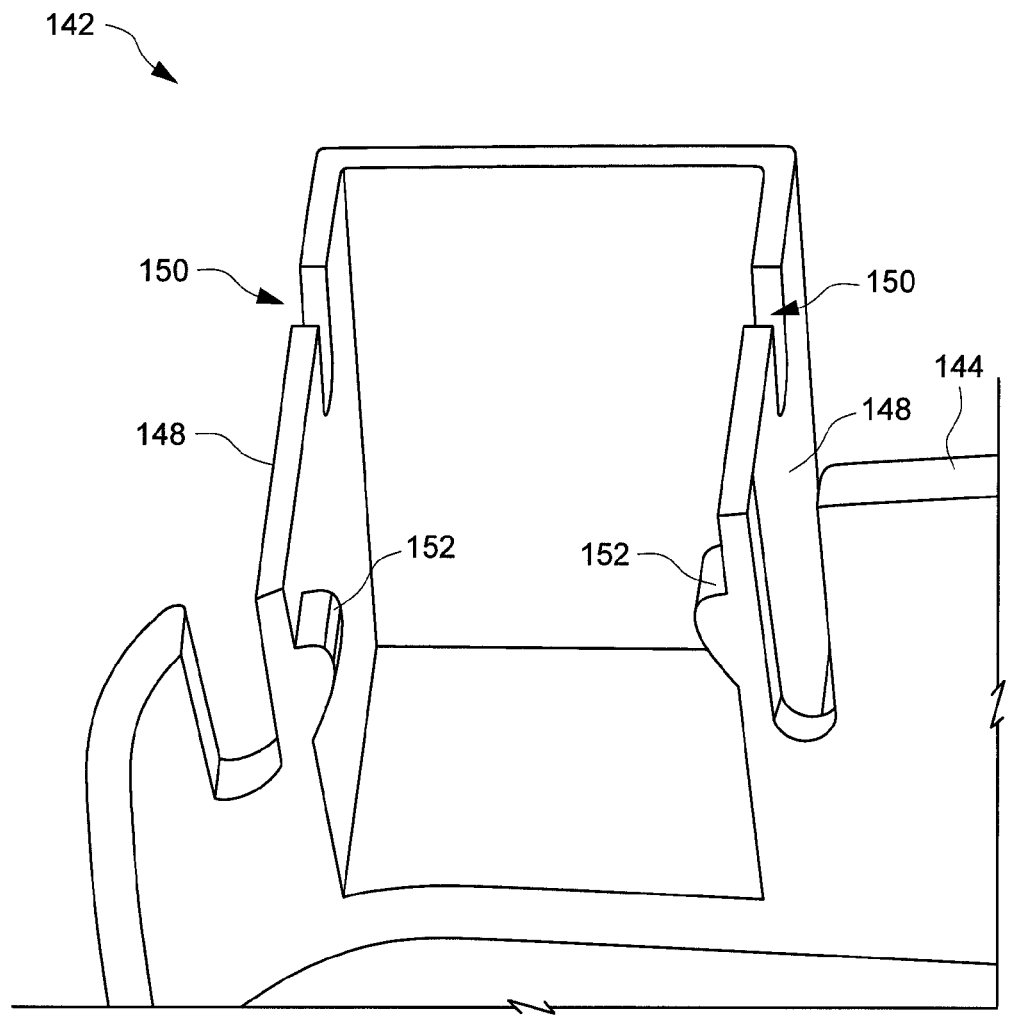
FIG. 12 is an enlarged view illustrating certain construction details of the mount frame portion.

The interior of the shell body 106 can be affixed with a mount frame portion 142 that is placed adjacent to the hole 115 formed through the sidewall 108. The mount frame portion 142 can be visible in FIGS. 9-12, wherein the representation of some portions of the shell body 106 (in particular the sidewall 108) is omitted in FIGS. 10 and 11 to better show the connection of the object holder 112 with the mount frame portion 142, and FIG. 12 is an enlarged view showing certain construction details of the mount frame portion 142. Referring to FIGS. 9-12, the mount frame portion 142 can have a surrounding wall 144 that encloses an inner cavity 146 communicating with the hole 115 of the sidewall 108, and a coupling portion having two opposite sidewalls 148 projecting outward (i.e., the sidewalls 148 are outside the inner cavity 146). The two sidewalls 148 can respectively include two slots 150, and two inward protrusions 152 located below the two slots 150.

For assembling the object holder 112 with the shell body 106, the second end 136B of the rotary arm 136 can be disposed between the two sidewalls 148 with the shaft 138 pivotally supported through the slots 150. The bracket 114 carrying the support base 116 can be thereby pivotally with the shell body 106 for rotational movement between the storage state shown in FIG. 2 and the deployed state shown in FIGS. 3 and 4. While the bracket 114 is in the deployed state, the inward protrusions 152 can contact against a stop surface 154 (better shown in FIG. 5) provided on the rotary arm 136, which can thereby sustain the object holder 112 in the deployed state against the gravity action.

Exemplary operation of the object holder 112 is described hereinafter with reference to FIGS. 2-11. In FIG. 2, the object holder 112 is shown in the storage state. In the storage state, the object holder 112 closes the hole 115 of the sidewall 108, and the outer surface 120 of the bracket 114 is substantially flush with an outer convex surface 156 of the sidewall 108. Moreover, the support base 116 is collapsed into the opening 122 of the bracket 114, so that the outer major surface 116A of the support base 116 can be substantially flush with the outer surface 120 of the bracket 114 (better shown in FIGS. 5 and 6).

Figure 3:
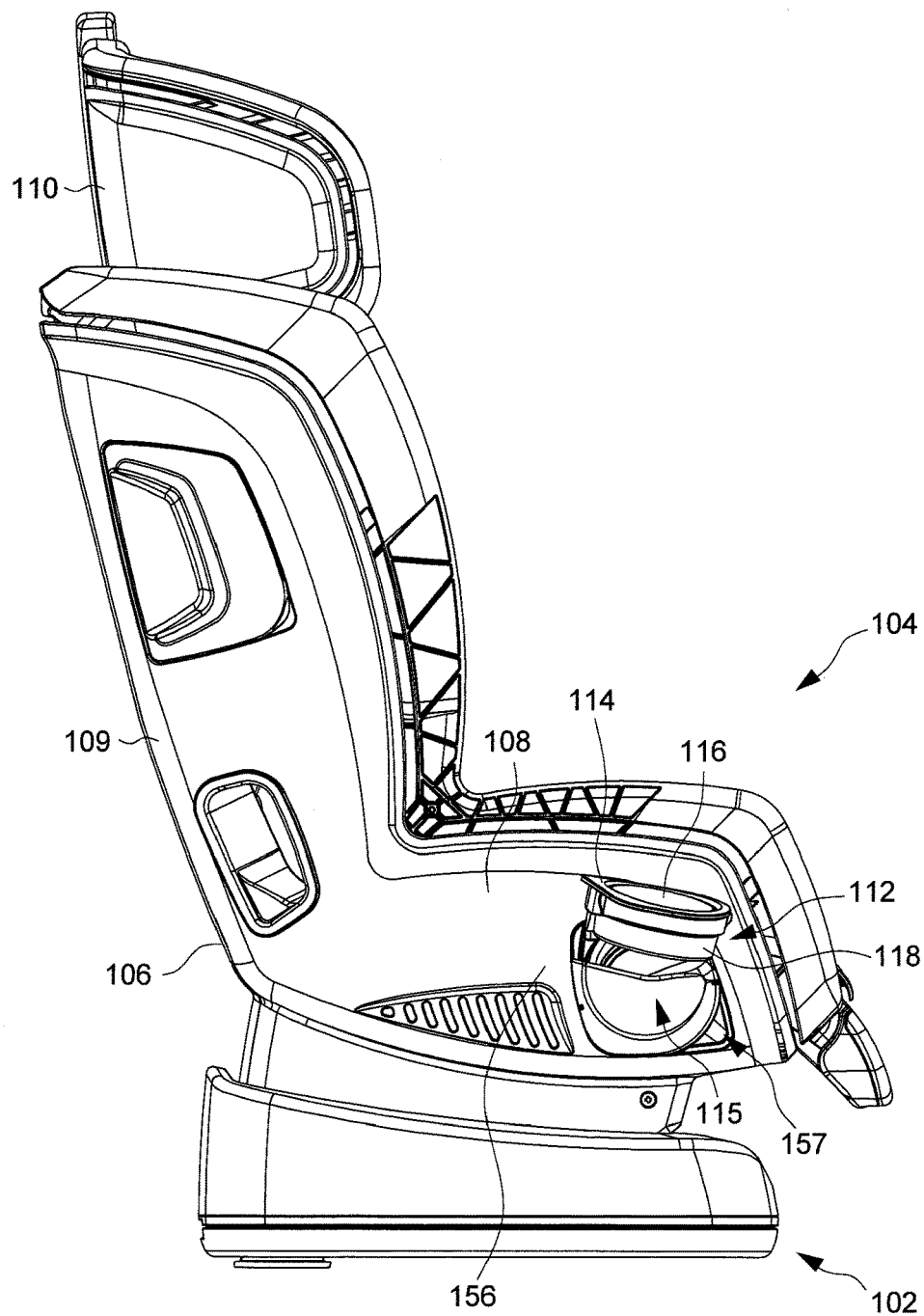
FIG. 3 is a side view of the child seat having the object holder in a deployed state and a support base of the object holder in a collapse position.
Figure 4:
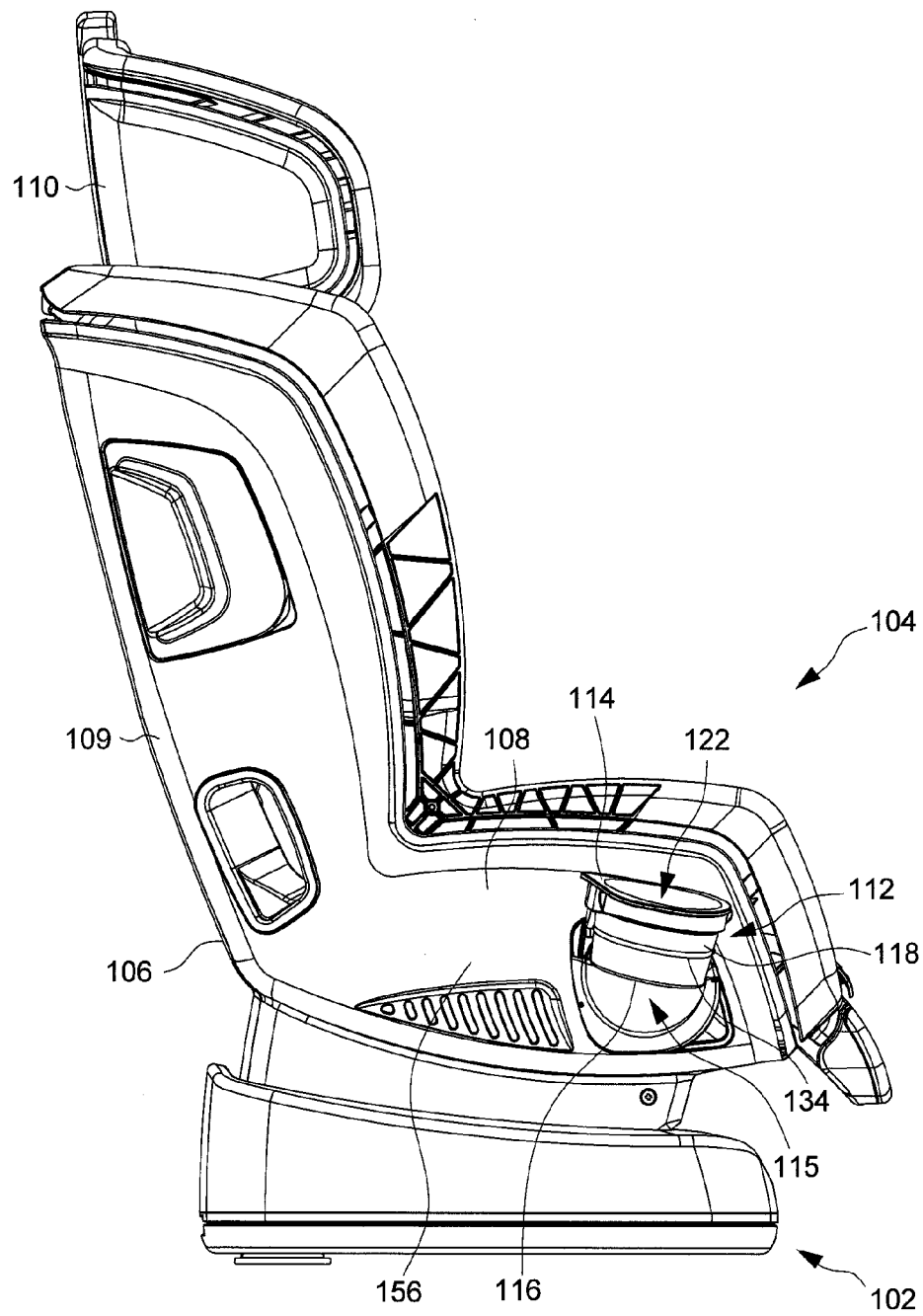
FIG. 4 is a side view of the child seat having the object holder in a deployed state and the support base of the object holder in an expanding position.

Referring to FIGS. 3 and 4, when there is a need for using the object holder 112, the object holder 112 can be rotated outward to the deployed state as shown in FIG. 3. The mount frame portion 142 of the shell body 106 can have a recess 157 (better shown in FIGS. 2 and 11) disposed at one side of the inner cavity 146 and adjacent to a rim of the hole 115. The recess 157 can facilitate insertion of a finger for rotating and deploying the object holder 112 outward. Once the object holder 112 reaches the deployed state, the stop surface 154 (better shown in FIG. 5) of the rotary arm 136 can engage with the inward protrusions 152 (better shown in FIG. 12) of the mount frame portion 142 to hold the deployed state of the object holder 112. The support base 116 then can be displaced downward relative to the bracket 114 to the expanding state as shown in FIGS. 4 and 7, which can unfold the linking member 118. The unfolded linking member 118 can thereby hang the support base 116 below the bracket 114, and the outer major surface 116A of the support base 116 facing upward can provide support for placement of various items such as a cup, drinking bottle, snack, etc.

Figure 13:
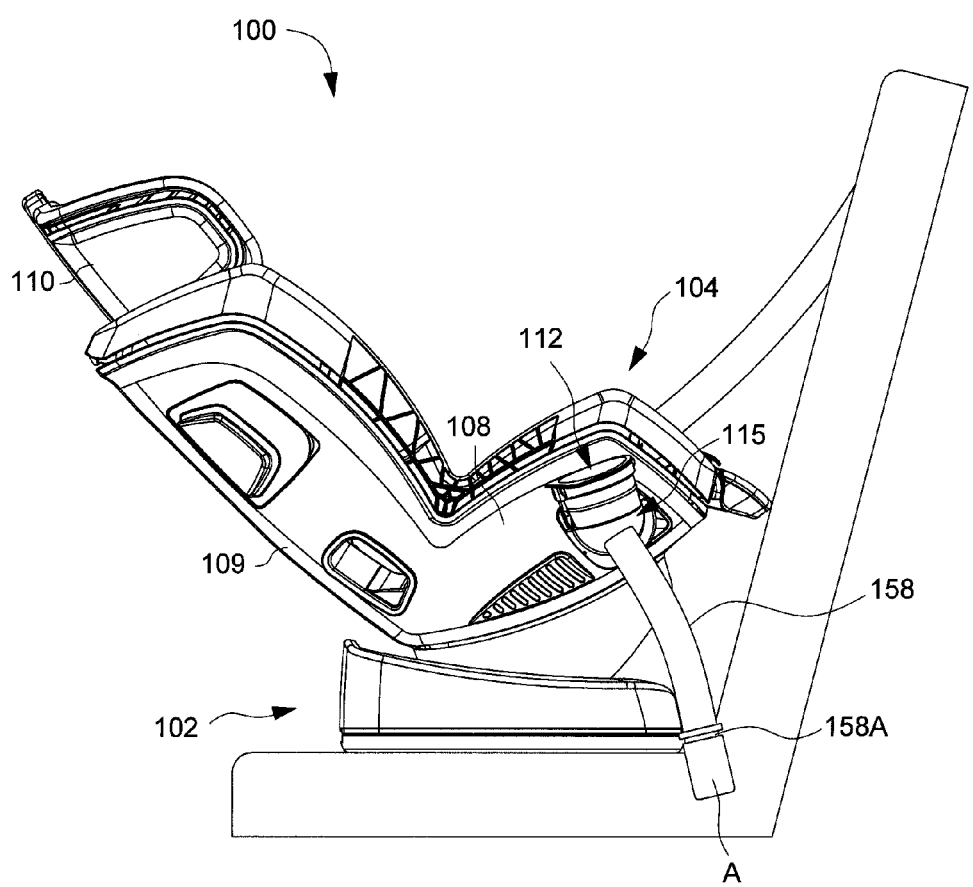
FIG. 13 is a schematic view illustrating the child seat installed on a vehicle seat and having a restraint harness attaching to an anchorage of the vehicle seat.

While the object holder 112 is in the deployed state, the hole 115 of the sidewall 108 is opened. As shown in FIG. 13, a restraint harness 158 can be installed transversally relative to the shell body 106 so as to extend outward through the opened hole 115. When the child seat 100 is placed on a vehicle seat, the restraint harness 158 thereby installed can attach the child seat 100 on the vehicle seat in a rearward facing configuration. In one embodiment, the restraint harness 158 can be a vehicle passenger's seatbelt, which can have a fastening connector 158A that can engage with an anchorage A provided in the vehicle. In another embodiment (not shown), the restraint harness 158 can be a separate strap independent from the vehicle passenger's seatbelt that have two ends provided with fastening connectors (such as ISO-FIX connectors) that can engage with an anchorage fixture provided in the vehicle.

Referring to FIGS. 6 and 7, for stowing the object holder 112, the support base 116 can be displaced upward relative to the bracket 114 from the expanding position to the collapse position received in the opening 122. As the support base 116 is displaced to the collapse position, the linking member 118 is folded so that the two portions 118C and 118D overlap with each other as shown in FIG. 6. Once the support base 116 is in the collapse position, the outer major surface 116A can be substantially flush with the outer surface 120 of the bracket 114, and the inward protrusions 124 in the opening 122 of the bracket 114 can contact against the linking member 118 and/or the support base 116 to prevent or limit sideways displacement of the support base 116 in the opening 122. Moreover, the two overlapping portions 118C and 118D of the folded linking member 118 can remain generally flat, and the folded linking member 118 can bear the support base 116 in the collapse state and prevent its falling back to the expanding position.

The bracket 114 carrying the support base 116 in the collapse position then can be rotated from the deployed state as shown in FIG. 3 toward the hole 115 of the sidewall 108, which urges the stop surface 154 (better shown in FIG. 5) of the rotary arm 136 to travel past the inward protrusions 152 (better shown in FIG. 12). The object holder 112 is rotated until it reaches the storage state having the support base 116 and the folded linking member 118 respectively received in the hole 115 of the sidewall 108 and the inner cavity 146 of the mount frame portion 142. The outer surface 120 of the bracket 114 can be substantially flush with the outer convex surface 156 of the sidewall 108 when the object holder 112 is in the storage state.

As shown in FIG. 2, the object holder 112 in the storage state can close the hole 115 of the sidewall 108, which can prevent undesirable intrusion in the interior of the shell body 106 and improve the general appearance of the child seat 100.

Figure 14:
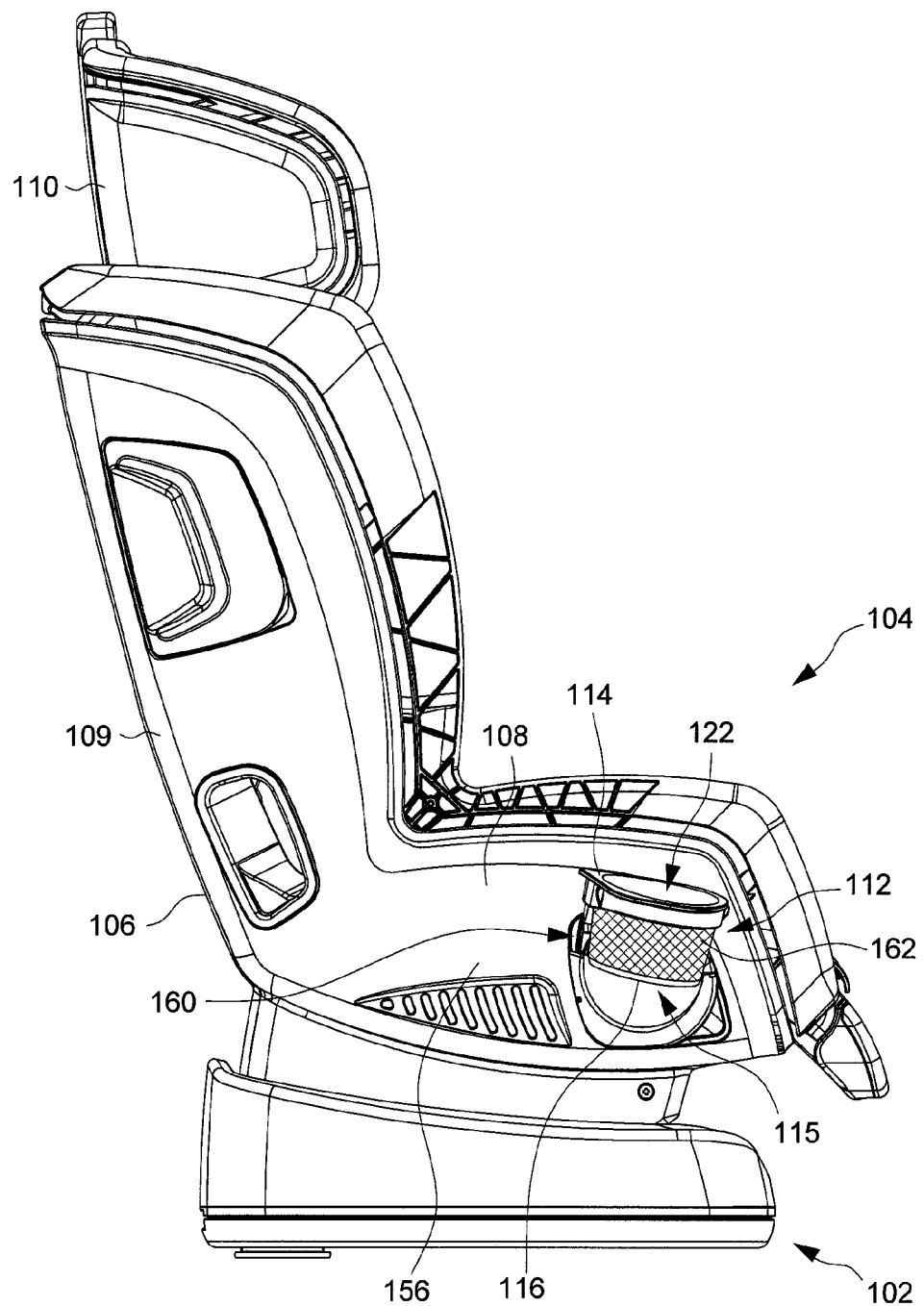
FIG. 14 is a schematic view illustrating the child seat provided with a variant to embodiment of an object holder.

FIG. 14 is a schematic view illustrating a variant embodiment of the object holder 112 in which the linking member 118 is replaced with another linking member 160 provided as a soft and flexible material, such as mesh 162. Like described previously, the mesh 162 can be stretched to hang the support base 116 in the expanding position, and can be folded when the support base 116 is received in the opening 122 of the bracket 114.

Figure 15:
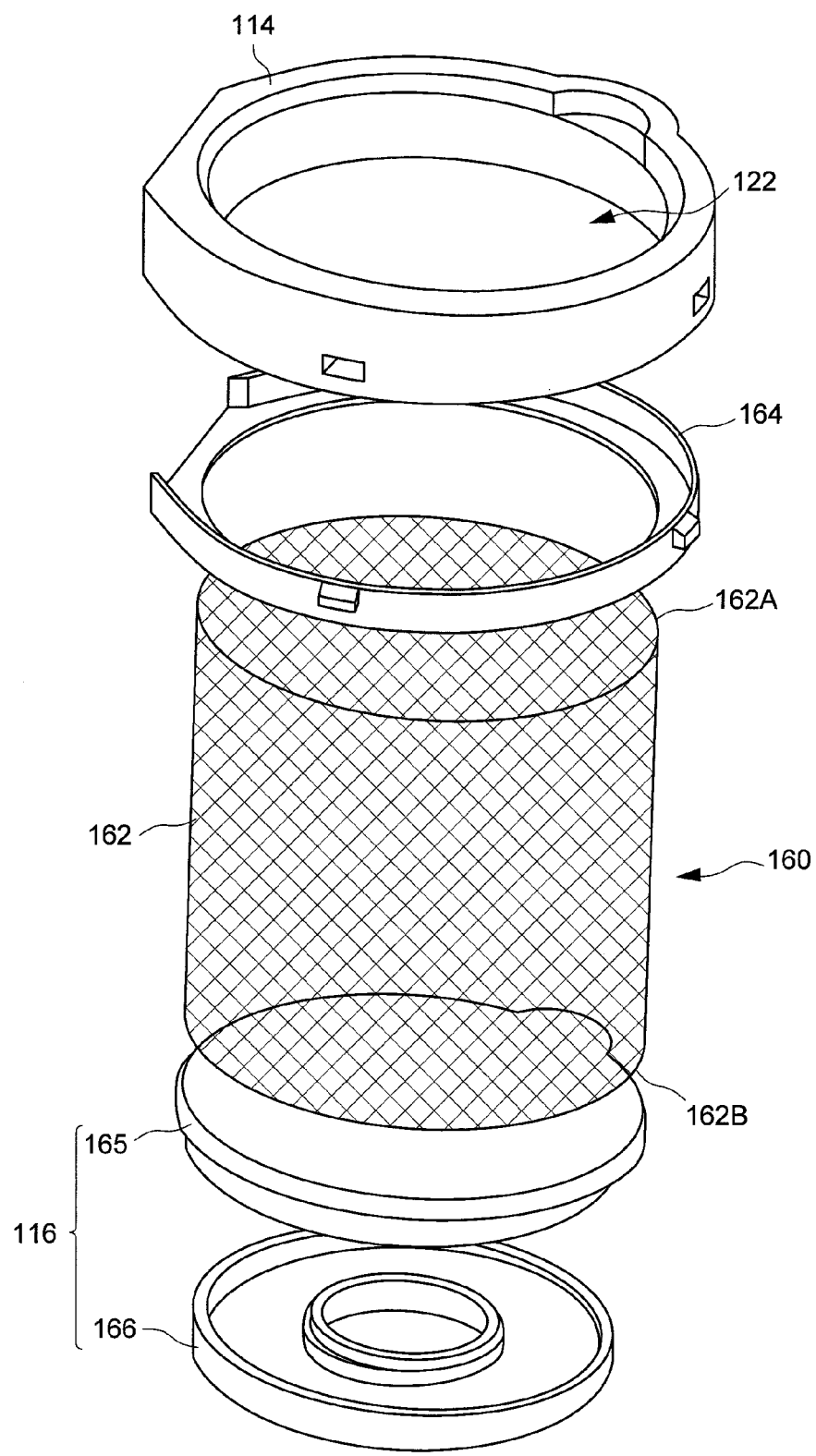
FIG. 15 is a schematic view illustrating an exemplary construction for attaching a mesh to a bracket and a support base in the object holder.

FIG. 15 is a schematic view illustrating an exemplary construction for respectively attaching the mesh 162 to the bracket 114 and the support base 116. Referring to FIG. 15, the mesh 162 can have two opposite ends 162A and 162B. The end 162A of the mesh 162 can be clamped between the bracket 114 and a snap ring 164 fixedly engaged with the bracket 114, and the end 162B of the mesh 162 can be clamped between a support pate 165 and a bottom cap 166 fixedly engaged with the support plate 165, the assembly of the support plate 165 and the bottom cap 166 forming the support base 116.

Figure 16:
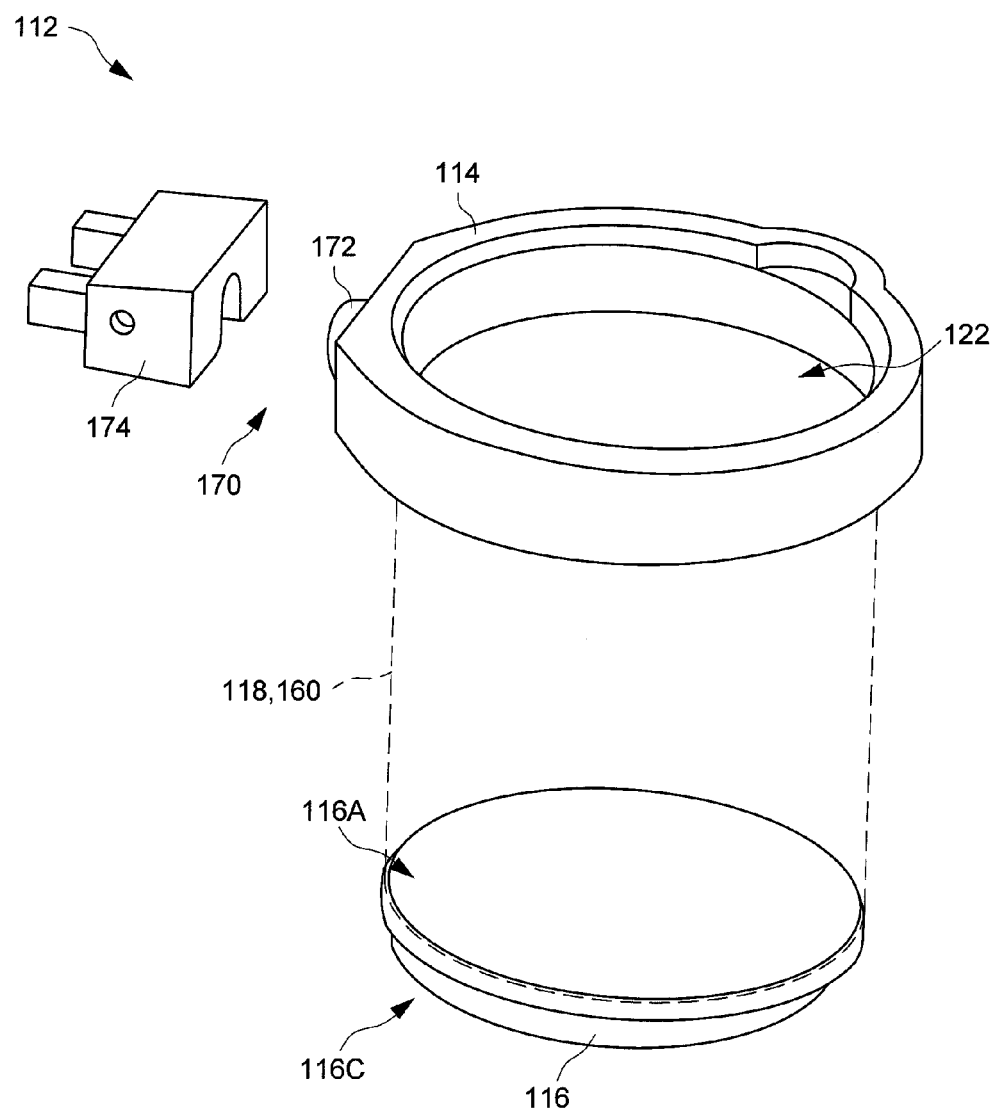
FIG. 16 is a schematic view illustrating another embodiment in which an articulation allowing multiple rotational degrees of motion can be used for assembling the object holder with the child seat.

In addition to the rotation for storing and deploying the object holder 112, some embodiments may also provide an additional degree of movement to allow inclination adjustment of the object holder 112 relative to the shell body 106. This may allow to adapt the object holder 112 to the recline position of the shell body 106 relative to the base 102. FIG. 16 is a schematic view illustrating an exemplary embodiment in which the bracket 114 of the object holder 112 can be connected with the shell body 106 via an articulation 170, which allows multiple rotational degrees of motion of the object holder 112 for storing and deploying the object holder 112 and for adjusting the inclination of the object holder 112 relative to the shell body 106. The articulation 170 can exemplary include a boss 172 affixed to the bracket 114, and a rotary arm 174 pivotally connected with the shell body. The rotary arm 174 can have a pocket in which is rotatably received the boss 172. This construction allows two different rotational degrees of movement: one about the pivot connection between the rotary arm 174 and the shell body, and another one about the pivot connection between the boss 172 and the rotary arm 174. Although the illustrated embodiment uses two distinct pivot connections, other embodiments may uses a ball joint to provide multiple rotational degrees. The assembly using the articulation 170 allowing multiple rotational degrees may be suitable for an object holder that uses the linking member 118 or 160 described previously.

Figure 17:
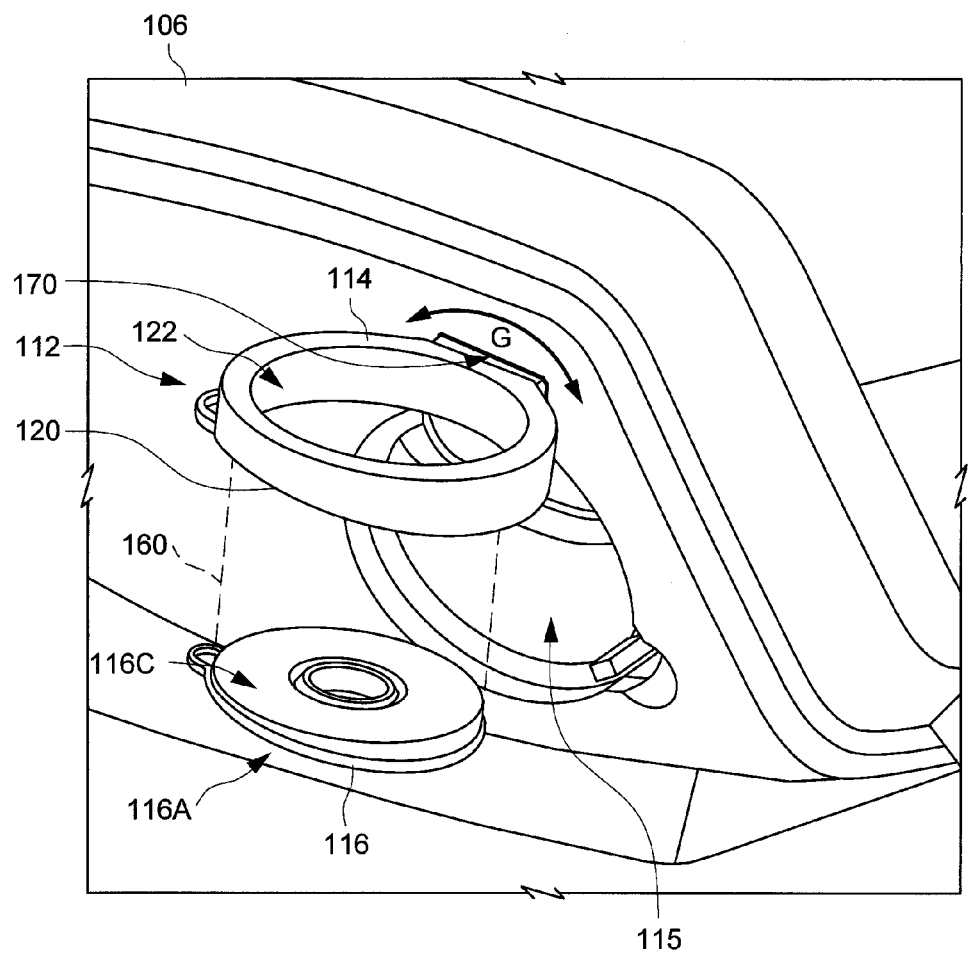
FIG. 17 is another schematic view illustrating exemplary operation of the object holder of the embodiment shown in FIG. 16.
Figure 18:
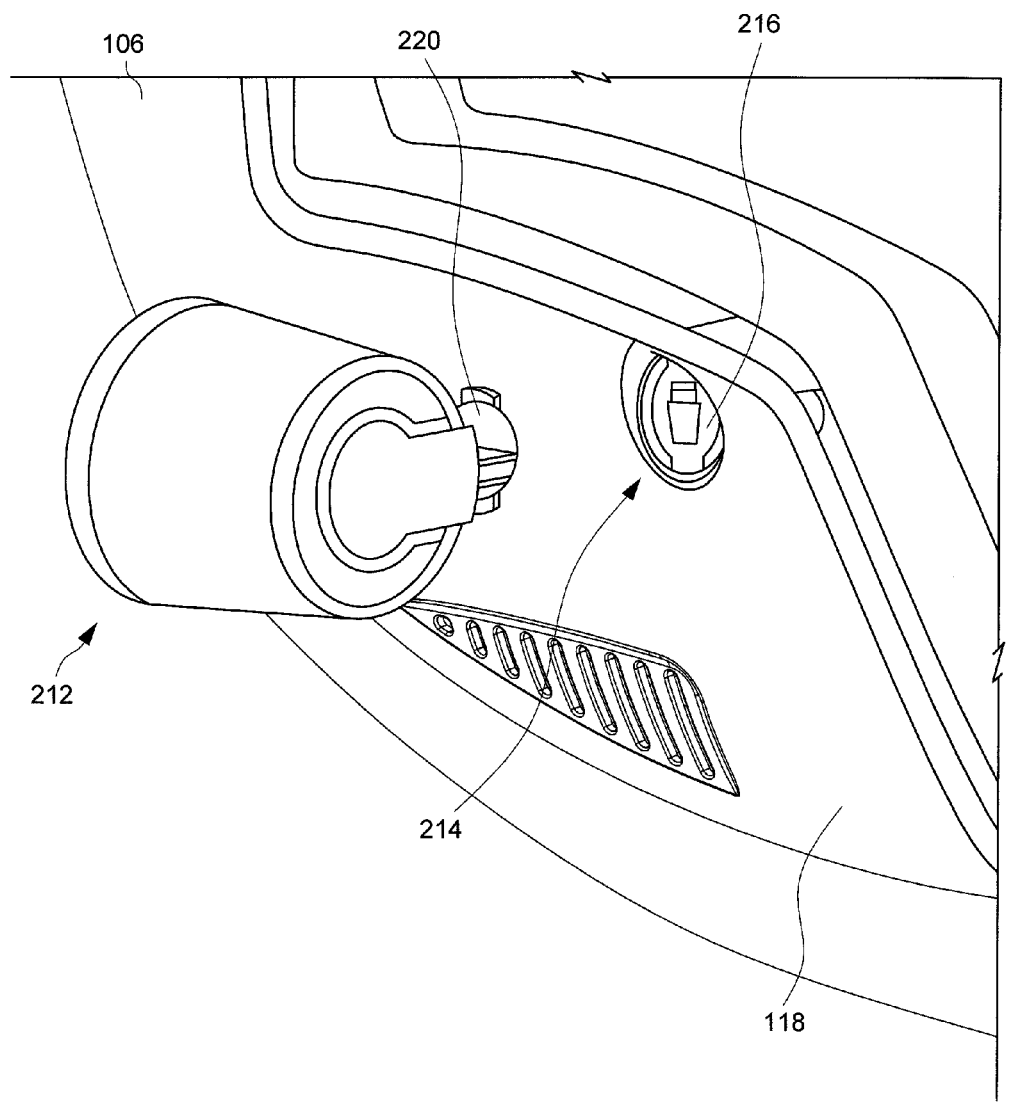
FIG. 18 is a schematic view illustrating another variant embodiment in which a removable object holder can be locked with a key slot provided on a shell body of a child seat.
Figure 19:
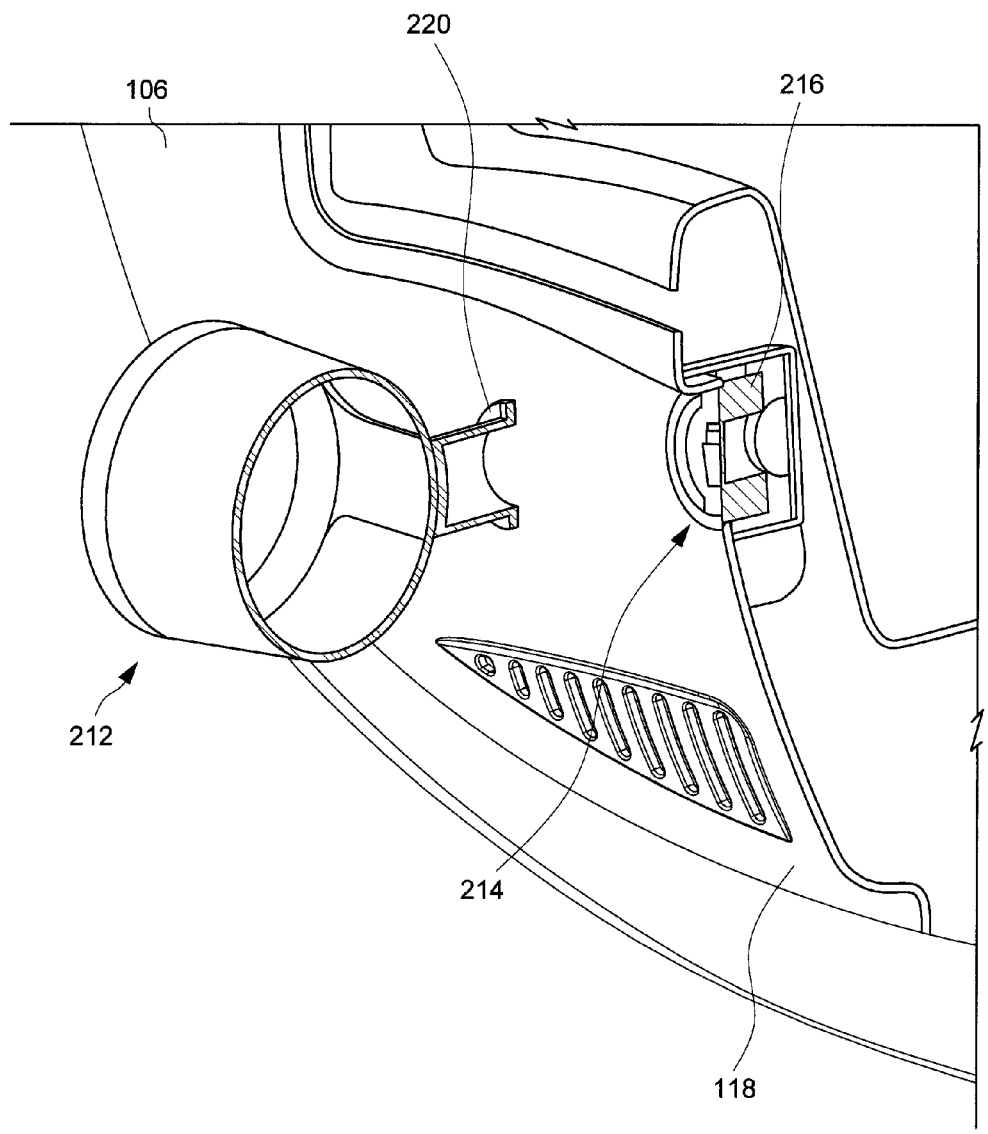
FIG. 19 is a cross-sectional view of the structure shown in FIG. 18.
Figure 20:
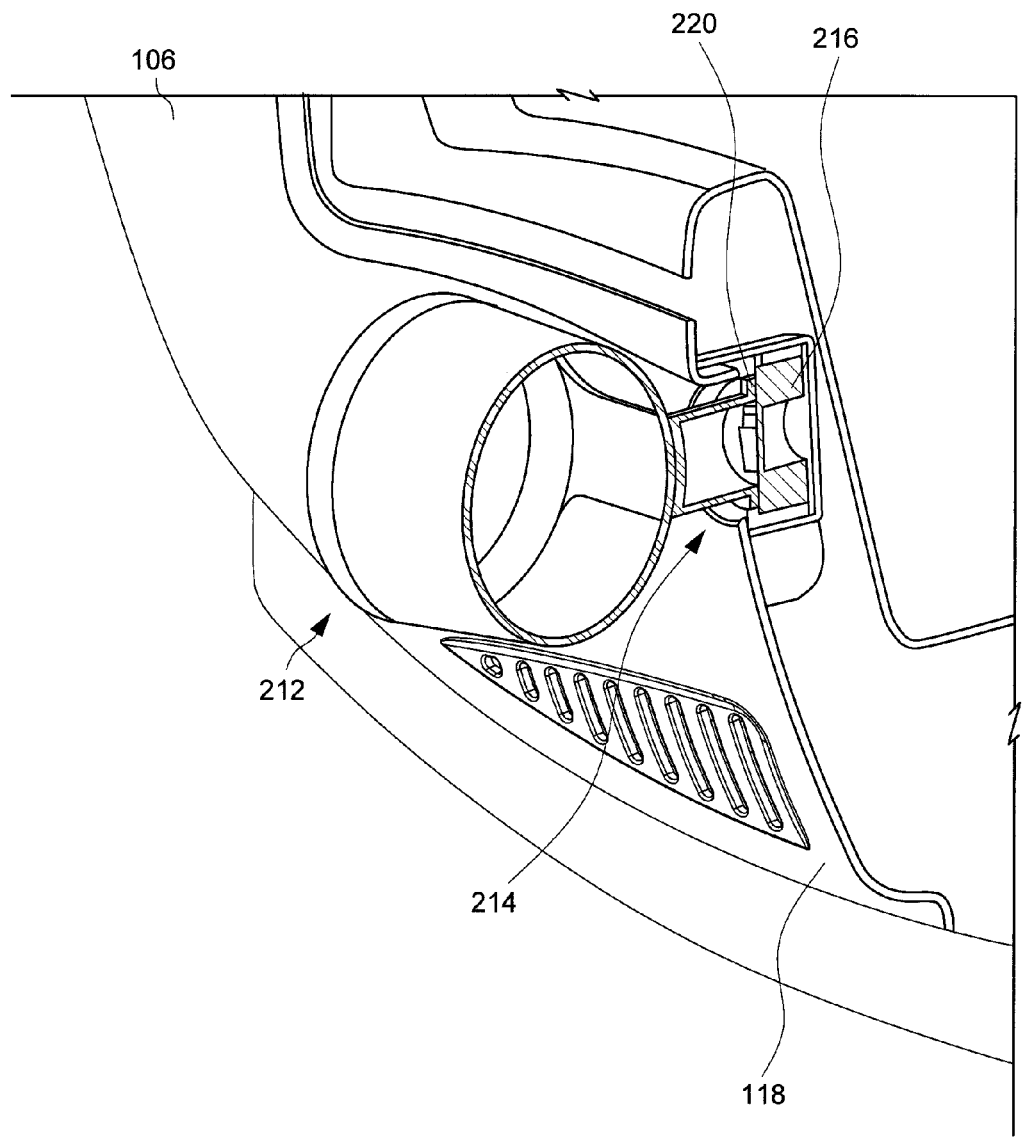
FIG. 20 is a cross-sectional view illustrating a key affixed to the object holder that is inserted into the key slot of the shell body.
Figure 21:
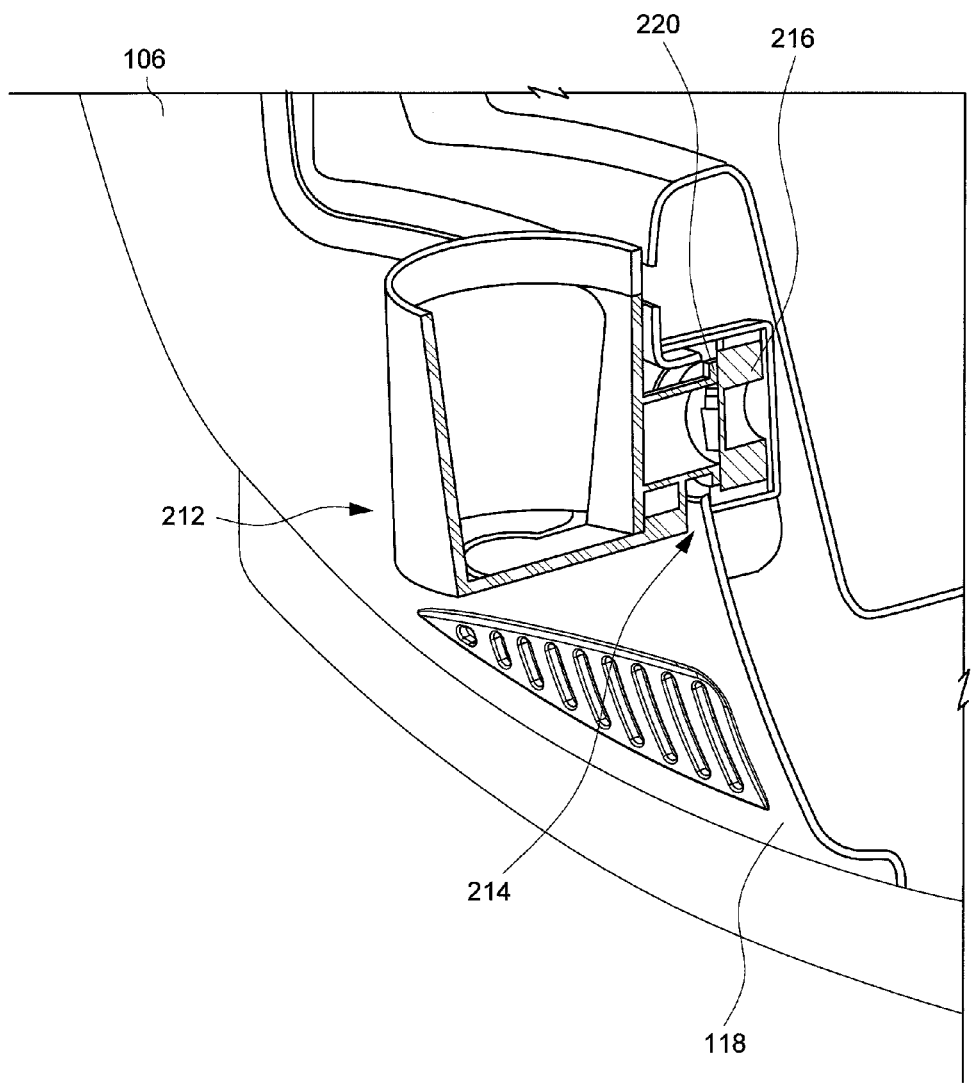
FIG. 21 is a cross-sectional view illustrating the key and the object holder that rotated to a locking position on the shell body of the child seat.

With reference to FIG. 17, the additional degree of rotation of the bracket 114 allowed by the articulation 170 (shown with the double arrow) may be further used to change the orientation of the outer major surface 116A and 116C of the support base 116 when the object holder 112 is switched between the storage state and the deployed state. In the variant embodiment shown in FIG. 17, while the object holder 112 is in the deployed state outside the hole 115, the support base 116 can drop downward from the bracket 114, and the outer major surface 116C of the support base 116 faces upward for placement of an object thereon while the opposite outer major surface 116A of the support base 116 faces downward. In this deployed state, the outer surface 120 of the bracket 114 faces downward. For storing the object holder 112, the bracket 114 can be rotated about 180 degrees such that the outer major surface 116A of the support base 116 faces upward and the outer major surface 116C faces downward, and the support base 116 can be received at least partially in the opening 122 of the bracket 114 such that the outer major surface 116A of the support base 116 is substantially flush with the upward-facing outer surface 120 of the bracket 114. The object holder 112 then can be rotated from the deployed state to the storage state to have the outer major surface 116C received inside the hole 115. Once the object holder 112 is in the storage state, the outer major surface 116A of the support base 116 can remain substantially flush with the outer surface 120 of the bracket 114.

The aforementioned embodiments provide object holders that are permanently assembled with the child seat, and can be moved into the shell body of the child seat for storage. Instead of a permanent assembly, alternate embodiments may provide a removable object holder. FIGS. 18-21 are schematic views illustrating another embodiment in which a removable object holder 212 can detachably connected with the shell body 106. In the embodiment shown in FIGS. 18-21, the shell body 106 can include a key slot 214, and a cap 216 that is spring-biased to close the key slot 214. Moreover, the object holder 212 can be affixed with a key 220 that can be inserted into the key slot 214 for locking the object holder 212 with the shell body 106.

When the object holder 212 is removed from the shell body 106, the cap 216 is biased by a spring to close the key slot 214 for preventing undesirable intrusion inside the shell body 106. For attaching the object holder 212 with the shell body 106, the key 220 can be inserted into the key slot 214 while the object holder 212 is oriented along a generally horizontal direction (better shown in FIG. 20), which pushes the cap 220 inward. The object holder 212 and the key 220 then can be rotated until the object holder 212 is properly oriented along a generally vertical direction and the key 220 is in locking engagement with the key slot 214 (better shown in FIG. 21), which can thereby lock the object holder 212 with the shell body 106 for use. To remove the object holder 212, the object holder 212 and the key 220 can be rotated reversely for unlocking, and then removed from the key slot 214 of the shell body 106.

Advantages of the child seat described herein include the ability to provide an object holder that can be conveniently stored and deployed for use. Moreover, the object holder may be placed adjacent to a hole used for installing a restraint harness for the child seat, so that the object holder when turned to the storage state can close the hole to prevent undesirable intrusion in the interior of the shell body. Accordingly, the child seat is more convenient to use.

Realizations of the child seat have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child seat comprising:
   a shell body having a sidewall provided with a hole having an upper edge portion and a lower edge portion located below the upper edge portion, the hole being configured to allow the passage of a restraint harness for attaching the child seat on a vehicle seat; and
   an object holder pivotally connected with the shell body at a location adjacent to the upper edge portion of the hole, the object holder being movable between a storage state closing the hole and a deployed state opening the hole, the object holder being spaced apart from the lower edge portion of the hole in the deployed state.

2. The child seat according to claim 1, wherein the object holder includes a bracket, a support base, and a flexible linking member having a first and a second end respectively attached to the bracket and the support base, the bracket having an outer surface and an opening exposed on the outer surface, the bracket being pivotally connected with the shell body, and the support base being movable through the opening between a collapse position and an expanding position, the support base in the collapse position being received in the opening, and the support base in the expanding position being hung by the flexible linking member below the bracket.

3. The child seat according to claim 1, wherein the hole is placed adjacent to a front of the shell body, a restraint harness being installable through the hole for attaching the child seat on the vehicle seat in a rearward facing configuration.

4. The child seat according to claim 1, wherein a restraint harness is installable through the hole for attaching the child seat on a vehicle seat when the object holder is in the deployed state.

5. A child seat comprising:
   a shell body having a sidewall, the sidewall being provided with a hole having an upper edge portion and a lower edge portion located below the upper edge portion; and
   an object holder including a bracket, a support base, and a flexible linking member having a first and a second end respectively attached to the bracket and the support base, the bracket being pivotally connected with the shell body at a location adjacent to the upper edge portion of the hole so that the object holder is movable between a storage state and a deployed state, the support base having a major surface for placement of an object thereon, the support base being movable relative to the bracket between a collapse position where the support base is received within an opening defined through the bracket, and an expanding position where the support base is hung below the bracket, wherein the object holder closes the hole with the major surface of the support base being exposed outward on the sidewall of the shell body in the storage state, and the object holder is spaced apart from the lower edge portion of the hole with the major surface of the support base facing upward in the deployed state.

6. The child seat according to claim 5, wherein the support base has a peripheral edge, and the flexible linking member is affixed to the support base along the peripheral edge, the support base in the expanding position and the flexible linking member defining at least partially an inner space for receiving the placement of an object.

7. The child seat according to claim 5, wherein the hole is configured for passage of a restraint harness for attaching the child seat on a vehicle seat.

8. The child seat according to claim 5, wherein the hole is placed adjacent to a front of the shell body.

9. The child seat according to claim 5, wherein the flexible linking member includes a mesh.

10. The child seat according to claim 5, wherein the flexible linking member includes an elastic member configured to assist in bearing the support base in the collapse position.

11. The child seat according to claim 5, wherein the flexible linking member is folded over and assists in bearing the support base in the collapse position, and is unfolded and hangs the support base in the expanding position below the bracket.

12. The child seat according to claim 11, wherein the flexible linking member has a crease along which the flexible linking member is folded over when the support base is in the collapse position.

13. The child seat according to claim 5, wherein the flexible linking member includes a thermoplastic elastomer (TPE).

14. The child seat according to claim 5, wherein the opening is exposed on an outer surface of the bracket, the support base in the expanding position is hung below the outer surface of the bracket, and the support base received in the opening in the collapse position is substantially flush with the outer surface of the bracket.

15. The child seat according to claim 14, wherein the outer surface of the bracket is substantially flush with an outer convex surface of the sidewall when the object holder is in the storage state.

16. The child seat according to claim 5, wherein the opening has an inner sidewall provided with one or more inward protrusion that form an abutment for preventing sideways displacement of the support base relative to the bracket when the support base is received in the opening.

* * * * *